United States Patent [19]

Gill et al.

[11] Patent Number: 4,596,661

[45] Date of Patent: Jun. 24, 1986

[54] METHOD FOR SETTLING CALCIUM CARBONATE

[75] Inventors: Jasbir S. Gill; Richard G. Varsanik, both of Coraopolis, Pa.

[73] Assignee: Calgon Corporation, Pittsburgh, Pa.

[21] Appl. No.: 698,220

[22] Filed: Feb. 4, 1985

[51] Int. Cl.$^4$ ................................................ C02F 1/56
[52] U.S. Cl. ........................................ 210/728; 209/5; 210/734
[58] Field of Search ................... 209/5; 210/725, 727, 210/728, 729, 732–734

[56] References Cited

U.S. PATENT DOCUMENTS

| | | | |
|---|---|---|---|
| 3,418,237 | 12/1968 | Boothe et al. | 210/734 |
| 3,493,501 | 2/1970 | Eck | 210/733 |
| 3,692,673 | 9/1972 | Hoke | 210/728 |
| 3,776,892 | 12/1973 | Bleyle | 210/734 |
| 3,836,512 | 9/1974 | Chu et al. | 210/733 |
| 4,146,473 | 3/1979 | Edelmann et al. | 210/728 |
| 4,210,531 | 7/1980 | Wang et al. | 210/727 |
| 4,331,785 | 5/1982 | Chamberlin et al. | 210/732 |
| 4,342,653 | 8/1982 | Halverson | 210/734 |
| 4,509,987 | 4/1985 | Farrar et al. | 106/308 Q |

FOREIGN PATENT DOCUMENTS

| | | | |
|---|---|---|---|
| 50-118980 | 9/1975 | Japan | 210/728 |
| 856247 | 12/1960 | United Kingdom | 210/727 |

*Primary Examiner*—Peter Hruskoci
*Attorney, Agent, or Firm*—Michael C. Sudol, Jr.; R. Brent Olson; William C. Mitchell

[57] ABSTRACT

The instant invention is directed to a method of settling fine calcium carbonate solids from a suspension comprising water and calcium carbonate, comprising adding to said suspension an effective amount of an admixture comprising: (a) an anionic polyelectrolyte; and (b) an anionic surfactant, wherein said polyelectrolyte/surfactant ratio ranges from 10:1 to 1:5, by weight.

3 Claims, No Drawings

METHOD FOR SETTLING CALCIUM CARBONATE

BACKGROUND OF THE ART

Calcium carbonate occurs naturally as limestone rock, which is generally defined as rock containing greater than 50 percent by weight calcium carbonate. This natural calcium carbonate is generally mined or quarried to produce a calcium carbonate product having designated size and purity characteristics.

Typical processing of limestone rock includes crushing, grinding and classification. Also, limestone rock is a raw material for precipitated grades of calcium carbonate. Precipitated calcium carbonate is typically manufactured by calcining limestone, thereby producing carbon dioxide and calcium oxide. The calcium oxide is hydrated to form calcium hydroxide, which is then carbonated to form calcium carbonate. After precipitation, the calcium carbonate may be further processed by screening and drying.

Other processes for the manufacture of calcium carbonate, such as the use of sodium carbonate to precipitate calcium carbonate and the calcium chloride process, are known in the art.

Natural calcium carbonate is widely used as a white pigment. Synthetic, or precipitated calcium carbonates are used in the manufacture of paper, paints, plastics, inks, rubber, adhesives, caulks, and sealants.

Irrespective of the processing technique used to manufacture calcium carbonate, the settling of fine calcium carbonate particles from slurries or suspensions remains a problem. The instant invention, which relates to compositions and a method for settling fine calcium carbonate particles from suspensions or solutions, thus constitutes a notable advance in the art.

As used herein, the term calcium carbonate includes both the naturally occurring and synthetic, or precipitated, calcium carbonate. The term also encompasses all crystalline structures of calcium carbonate, including but not limited to calcite and aragonite.

Settling, as used herein, is defined as the separation of a slurry or suspension into components having greater and lesser concentrations of the solid or solids than does the original slurry or suspension. As such, the terms settling, sedimentation, and separation are synonomous and interchangeable.

Suspensions and slurries are defined as liquid-solids systems wherein the solids are dispersed or entrained in a liquid. For example, slurries or suspensions may comprise water as the liquid and calcium carbonate as the solid.

Calcium carbonate particles less than 2 microns in size are particularly difficult to settle from a calcium carbonate-liquid system. The inventors have found that, by adding specified compositions of polyelectrolytes and surfactants to these systems or suspensions, at designated dosages, these fine calcium carbonate particles rapidly settle, thereby producing a clear supernatant liquid and a more concentrated solid phase. This improved separation increases calcium carbonate yields, while minimizing water treatment costs.

Though settling aids such as Accurac 161, a nonionic emulsion commercially available from American Cyanamid Company, have been used to settle calcium carbonate particles from slurries or suspensions, no settling aids known to the inventor have the ability to settle fine calcium carbonate particles as do the instant compositions. Additionally, the instant compositions produce a soft, flowable cake while improving overall settling rates.

DETAILED DESCRIPTION OF THE INVENTION

The instant invention is directed to a method of settling fine calcium carbonate particles from a suspension comprising calcium carbonate particles and water comprising adding to said suspension an effective amount of an admixture comprising: (a) an anionic polyelectrolyte; and (b) an anionic surfactant, wherein said anionic polyelectrolyte/anionic surfactant ratio ranges from 10:1 to 1:5, by weight.

The instant invention is further directed to a composition comprising: (a) an anionic polyelectrolyte; and (b) an anionic surfactant, wherein said composition is useful in settling fine calcium carbonate particles from a suspension comprising calcium carbonate and water, and wherein the ratio of said polyelectrolyte to said anionic surfactant is 10:1 to 1:5.

Anionic polyelectrolytes, as used herein, are polymers that carry negatively charged groups along the polymer chain. The preferred anionic polyelectrolytes employed in the compositions and process of the instant invention are polymers of any unsaturated carboxylic acid, or salts thereof. As examples of these preferred polymers, there may be mentioned: polymers of acrylic acid, methacrylic acid, alpha-halo-acrylic acid, maleic acid or anhydride, itaconic acid, vinyl acetic acid, allylacetic acid, fumaric acid, $\beta$-carboxyethyl acrylate and crotonic acid, alone or in combination, and salts thereof. Also preferred are polymers of acrylic acid and/or methacrylic acid with other polymerizable unsaturated water-soluble monomers, including but not limited to, polyethylene glycol mono methacrylate, 2-hydroxypropyl acrylate, vinyl sulfonic acid, vinyl phosphonic acid, vinyl acetate, ethyl vinyl ether, acrylamide, ethyl acrylate, ethyl methacrylate, methacrylamide, 2-acrylamido-2-methylpropyl sulfonic acid, styrene sulfonic acid, sulfoalkyl acrylate, sulfoalkyl methacrylate, allyl sulfonic acid, methallyl sulfonic acid, and 3-methacrylamido-2-hydroxypropyl sulfonic acid, alone or in combination, their salts and mixtures thereof. Also included in this class of polymers are those polymers of acrylamide which are partially hydrolyzed.

The molecular weight of the polymer used is not critical. The preferred polymers have molecular weights of from about 1,000 to about 5,000,000 and the most preferred polymers have molecular weights of from about 1,000 to about 25,000, as determined by light scattering techniques.

As specific examples of these preferred anionic polyelectrolytes, there may be mentioned: homopolymers of acrylic acid, homopolymers of methacrylic acid, copolymers of acrylic acid and methacrylic acid, copolymers of acrylic acid and 2-acrylamido-2-methyl propyl sulfonic acid, copolymers of methacrylic acid and 2-acrylamido 2-methyl propyl sulfonic acid, copolymers of acrylic acid and 2-hydroxypropyl acrylate, copolymers of methacrylic acid and 2-hydroxypropyl acrylate, poly maleic acid, copolymers of maleic acid or anhydride and sulfonated styrene, copolymers of maleic acid or anhydride and acrylic acid or methacrylic acid, copolymers of acrylic acid or methacrylic acid and acrylamide or methacrylamide, terpolymers of acrylic acid, 2-acrylamido-2-methyl propyl sulfonic acid and polyethylene glycol mono methacrylate, and terpolymers of methacrylic acid, 2-acrylamido-2-methyl propyl sulfonic acid and polyethylene glycol mono methacrylate, and homologs thereof.

The second component required by the instant process and compositions is an anionic surfactant. Anionic surfactants, as used herein, are defined as compounds having a negatively charged surface-active moiety. Any anionic surfactant can be used. Preferred anionic surfactants include, but are not limited to, sulfonates, sulfates, phosphates, and succinates. Further, sodium and potassium salts of these surfactants are also acceptable due to their greater solubility in water. More preferred are anionic surfactants which include, but are not limited to, alkyl, aryl and alkylaryl sulfonates, sulfosuccinates, sulfoesters of fatty acids, sulfated alcohols, sulfated esters, ethoxylated alcohol sulfates, sulfated alkyl phenol ethoxylates, and phosphate esters.

Preferred succinates are dialkylsulfosuccinates and ethoxylated alcohol half esters or ethoxylated nonylphenol half esters of sulfosuccinic acid, and their salts. This class includes, but is not limited to, sodium di(2-ethyl-hexyl)sulfosuccinate, dioctylsulfosuccinate, diisobutylsulfosuccinate, dihexylsulfosuccinate, diamylsulfosuccinate, disodium ethoxylated alcohol half ester of sulfosuccinic acid and disodium ethoxylated nonyl phenol half ester of sulfosuccinic acid. Another preferred succinate is polyethyleneoxysulfosuccinate. Examples of preferred succinates are Aerosol A-102 and Aerosol A-103, available from American Cyanamid Company.

The preferred sulfated surfactants are sulfated polyoxyethylene alkylphenols. The preferred phosphate esters are alkylorthophosphates such as butyl phosphate, hexyl phosphate, 2-ethylhexyl phosphate, octyl phosphate, decyl phosphate, octyldecyl phosphate, mixed allyl phosphates, and alkyl polyphosphates, such as hexyl polyphosphate, and octyl polyphosphate, polyphosphated alcohols, ethoxylated and phosphated alkyl alcohols, and ethoxylated and phosphated alkyl phenols, or salts thereof, especially sodium and potassium salts. Another preferred phosphate surfactant is octylphenoxypolyethoxyethylphosphate, or its sodium or potassium salts.

An example of a preferred phosphate ester salt is Triton H-66, available from Rohm & Haas Company.

The weight ratio of polyelectrolyte to surfactant should be 10:1 to 1:5, on a weight:weight basis, preferably 5:1 to 1:1.5, and most preferably from 1.5:1 to 1:1.5.

The term "effective amount" of the settling aids disclosed herein means that dosage of settling aid necessary to settle fine calcium carbonate particles in the suspension being treated. Fine calcium carbonate particles include those having particle diameters less than 1-2 microns Treatment levels can be as high as 1000 ppm (based on the total weight of the slurry or suspension being treated), depending on the concentration of solids in the suspension and the temperature of the suspension. The preferred treatment level is from 0.1 to 1000 ppm, based on the total weight of the suspension or slurry being treated, and the most preferred treatment level is from 0.1 to 100 ppm. Typically, these slurries or suspensions contain 2 to 10%, by weight, solids. Slurries containing higher solids concentrations may require higher dosages.

The preferred settling aids are admixtures comprising: (a) a water soluble anionic polyelectrolyte having a weight average molecular weight of less than 25,000, as determined by light scattering techniques, comprising an unsaturated carboxylic acid selected from the group consisting of acrylic acid, methacrylic acid, α-haloacrylic acid, maleic acid or anhydride, vinylacetic acid, allylacetic acid, fumaric acid, β-carboxyethylacrylate, their salts, and mixtures thereof, and an unsaturated sulfonic acid selected from the group consisting of 2-acrylamido-2-methylpropylsulfonic acid, 2-methacrylamido-2-methylpropylsulfonic acid, vinylsulfonic acid, sulfoalkyl acrylate, sulfoalkyl methacrylate, allylsulfonic acid, methallylsulfonic acid, 3-methacrylamido-2-hydroxypropylsulfonic acid, their salts and mixtures thereof, having a weight ratio of 1:20 to 20:1; and (b) an anionic surfactant selected from the group consisting of alkylorthophosphates, alkylpolyphosphates, octylphenoxypolyethoxy-ethylphosphates, sulfosuccinates, esters of sulfosuccinates and salts thereof, alone or in combination, wherein the weight ratio of component (a) to component (b) is 10:1 to 1:5. More preferably, this ratio is 5:1 to 1:1.5, and most preferably 1.5:1 to 1:1.5.

The most preferred settling aid is an admixture of: (a) a water soluble anionic polyelectrolyte of acrylic acid or methacrylic acid and 2-acrylamido-2-methylpropylsulfonic acid, and their salts, having a weight ratio of 1:20 to 20:1; and (b) an anionic surfactant selected from the group consisting of alkylorthophosphates, alkyl polyphosphates, octylphenoxypolyethoxyethylphosphates, sulfosuccinates, esters of sulfosuccinates, and salts thereof, wherein the component (b) is 10:1 to 1:5. More preferably, this ratio is 5:1 to 1:1.5, and most preferably 1.5:1 to 1:1.5. Unexpectedly, the instant compositions effectively settle calcium carbonate particles from aqueous suspensions comprising water and calcium carbonate. They are effective in settling fine calcium carbonate particles less than 2 microns in diameter, and especially effective in settling calcium carbonate particles less than 1 micron in diameter.

Though it is preferred that the anionic polyelectrolytes and anionic surfactants of this invention be combined and utilized as compositions, they may be added separately without departing from the spirit of the invention.

EXAMPLES

The following examples illustrate the present invention in greater detail. It should be understood, however, that these examples in no way limit the present invention.

In Examples 1-4, settling aids were evaluated using a low solids suspension comprising water and 7.2% by weight calcium carbonate solids. The calcium carbonate particles were approximately 1 micron in diameter. Dosages are based on the total suspension weight.

The testing was carried out in a 100 cc graduate. The numbers appearing in Table 1, below, indicate the volume of floc in the graduate after various times.

TABLE 1

| Example* Number | Settling Aid | Active Settling Aid | | Floc Volume (cc) | | | | | Cake Solids |
|---|---|---|---|---|---|---|---|---|---|
| | | Wt. Ratio | Dosage (ppm) | 1 Hour | 2 Hour | 3 Hour | 4 Hour | 24 Hour | Per-Cent |
| 1 | AA-AMPS/Triton H-66 | 1:1 | 50 | 28 | 25 | 22 | 21 | 17 | 18.1 |
| 2 | AA-AMPS/Triton H-66 | 1:1 | 70 | 29 | 24 | 22 | 20 | 16 | 18.1 |
| 3 | AA-AMPS/Triton H-66 | 1:1 | 100 | 24 | 22 | 21 | 19 | 17 | 21.3 |
| 4 | ACCURAC 161 (Comparison example) | N/A | 70 | 14 | 12 | 12 | 12 | 11 | 18.2 |

*AA-AMPS is a copolymer of acrylic acid and 2-acrylamido-2-methyl propyl sulfonic acid having a molecular weight of approximately 8200 as determined by low angle laser light scattering.
Triton H-66 is a potassium salt of phosphate ester, available from Rohm and Haas Company.
Accurac 161 is a proprietary nonionic emulsion, available from American Cyanamid Company.

Examples 1-4 show that the AA-AMPS/Triton H66 composition substantially increased floc volume at comparable percent solids when compared to a conventional calcium carbonate settling aid.

In examples 5-14, settling aids were evaluated using the calcium carbonate suspension of examples 1-4. Table 2, below, shows the settling times required to accumulate 10 cc of floc.

TABLE 2

| Example* Number | Settling Aid | Weight Ratio | Active Settling Aid Dosage (ppm) | Description of Supernatant | Time for 10 cc of floc to settle (Min.) |
|---|---|---|---|---|---|
| 5 | AA-AMPS/Triton H-66 | 1:1 | 100 | Clear | 9 |
| 6 | AA-AMPS/Aerosol A-102 | 1:1 | 100 | Clear | 10 |
| 7 | AA-AMPS/Aerosol A-103 | 1:1 | 100 | Clear | 10 |
| 8 | AA-AMPS/Triton H-66 | 5:1 | 100 | Clear | 10 |
| 9 | AA-AMPS/Triton H-66 | 1:5 | 100 | Milky | 32 |
| 10 | AA/Triton H-66 | 1:1 | 100 | Clear | 29 |
| 11 | AA-AMPS-HEM 5/Triton H-66 | 1:1 | 100 | Clear | 18 |
| 12** | (None) | — | — | Milky | 23 |
| 13** | Triton H-66 | — | 100 | Milky | 39 |
| 14** | AA-AMPS | — | 100 | Milky | 60 |

**Comparison examples
*AA-AMPS is a copolymer of acrylic acid and 2-acrylamido-2-methyl propyl sulfonic acid having a molecular weight of approximately 8200, as determined by low angle laser light scattering.
Triton H-66 is a potassium salt of phosphate ester, available from Rohm & Haas Company.
Aerosol A-102 is a disodium ethoxylated alcohol half ester of sulfosuccinic acid, available from American Cyanamid Company.
Aerosol A-103 is a disodium ethoxylated nonylphenol half ester of sulfosuccinic acid, available from American Cyanamid Company.
AA is polyacrylic acid, having a molecular weight of approximately 4700, as determined by light scattering, available from Calgon Corporation.
AA-AMPS-HEM 5 is a terpolymer of acrylic acid, 2-acrylamido-2-methyl propyl sulfonic acid and polyethylene glycol mono methacrylate, available from Calgon Corporation. This polymer was prepared using HEM 5, a polyethylene glycol monomethacrylate monomer available from Alcolac Chemical Company.

Examples 5-14 show the synergistic effect of the polyelectrolytes and surfactants of the instant invention, in terms of settling time and supernatant clarity.

What is claimed is:

1. A method of settling fine calcium carbonate solids from a suspension comprising water and at least 2% by weight calcium carbonate solids having a particle diameter less than 2 microns, comprising adding to said suspension at least 50 ppm, based on the total weight of said suspension, an admixture comprising: (a) a water-soluble anionic polyelectrolyte having a weight average molecular weight of from about 1000 to about 25,000, as determined by light scattering techniques, selected from the group of polymers consisting of: polymers comprising an unsaturated carboxylic acid selected from the group consisting of acrylic acid and methacrylic acid and an unsaturated sulfonic acid selected from the group consisting of 2-acrylamido-2-methylpropyl sulfonic acid and 2-methacrylamido-2-methylpropyl sulfonic acid, and salts of these polymers, wherein the carboxylic acid:sulfonic acid weight ratio is 1:20 to 20:1 and (b) an anionic surfactant selected from the group consisting of ethoxylated alcohol half esters of sulfosuccinic acid, ethoxylated nonylphenol half esters of sulfosuccinic acid, octylphenoxy polyethoxyethylphosphate and salts thereof; wherein the weight ratio of (a) to (b) ranges from 5:1 to 1.5, to flocculate said calcium carbonate particles, settling the flocculated calcium carbonate particles from said suspension and producing a soft, flowable cake and a clear supernatent.

2. The method of claim 1, wherein said effective amount ranges from 50 to 100 ppm, based on the total weight of said suspension.

3. The method of claim 1, wherein said anionic polyelectrolyte is a water-soluble polymer of acrylic acid or methacrylic acid and 2-acrylamido-2 methylpropyl sulfonic acid, and their salts.

* * * * *